(12) United States Patent
Egami et al.

(10) Patent No.: US 7,383,059 B2
(45) Date of Patent: Jun. 3, 2008

(54) PORTABLE TERMINAL DEVICE AND COMMUNICATIONS DEVICE SYSTEM WHEREIN THE DEVICE IS USED

(75) Inventors: Tsuyoshi Egami, Kobe (JP); Nobuaki Kobayashi, Kadoma (JP)

(73) Assignees: Sanyo Electric Co., Ltd., Moriguchi-shi (JP); Sanyo Telecommunications Co., Ltd., Daito-shi (JP)

( * ) Notice: Subject to any disclaimer, the term of this patent is extended or adjusted under 35 U.S.C. 154(b) by 737 days.

(21) Appl. No.: 10/504,323

(22) PCT Filed: Mar. 19, 2003

(86) PCT No.: PCT/JP03/03384

§ 371 (c)(1),
(2), (4) Date: Aug. 24, 2004

(87) PCT Pub. No.: WO03/081929

PCT Pub. Date: Oct. 2, 2003

(65) Prior Publication Data
US 2005/0153747 A1    Jul. 14, 2005

(30) Foreign Application Priority Data
Mar. 27, 2002    (JP) .............................. 2002-087337

(51) Int. Cl.
*H04M 1/00*    (2006.01)
(52) U.S. Cl. .................. 455/550.1; 418/461; 418/565
(58) Field of Classification Search ................ 455/565, 455/418, 461, 550.1
See application file for complete search history.

(56) References Cited

U.S. PATENT DOCUMENTS 6,912,399 B2 *   6/2005   Zirul et al. .................. 455/463

2001/0006893 A1   7/2001   Yoshioka .................... 455/435

FOREIGN PATENT DOCUMENTS

| EP | 1 162 853 | 12/2001 |
|---|---|---|
| EP | 1 172 991 | 1/2002 |
| GB | 2 357 218 | 6/2001 |
| JP | 10-42036 | 2/1998 |
| JP | 11-18159 | 1/1999 |
| JP | 2000-295661 | 10/2000 |

(Continued)

OTHER PUBLICATIONS

Anonymous: "Mobile phone using user-defined, location-dependent profiles" Research Disclosure, Kenneth Mason Publications, Hampshire, GB vol. 438, No. 21, Oct. 2000, XP007126889 ISSN: 0374-4353 the whole document.
Supplementary European Search Report of Apr. 15, 2005.

*Primary Examiner*—Joseph Feild
*Assistant Examiner*—S. Smith
(74) *Attorney, Agent, or Firm*—Kratz, Quintos & Hanson, LLP

(57) ABSTRACT

A portable terminal device comprises an antenna for receiving radio waves from a base station, an incoming call alarm for notifying the user of the reception of radio waves, a control circuit provided between the antenna and the alarm for activating the alarm and a memory. The memory is capable of storing therein a predetermined incoming call rejecting condition or incoming call notifying condition via the control circuit. The control circuit includes comparison means for detecting whether one of information as to the current time and date, information as to the self-location of the device and information as to the caller or the combination of these items of information is in match with the incoming call rejecting condition or incoming call notifying condition stored in the memory. The control circuit has the function of changing over to predetermined incoming call rejecting means or incoming call notifying means when a match is obtained.

7 Claims, 5 Drawing Sheets

FOREIGN PATENT DOCUMENTS

| | | |
|---|---|---|
| JP | 2001-5381 | 1/2001 |
| JP | 2001-189774 | 7/2001 |
| JP | 2001-333177 | 11/2001 |
| JP | 2002-084569 | 3/2002 |

* cited by examiner

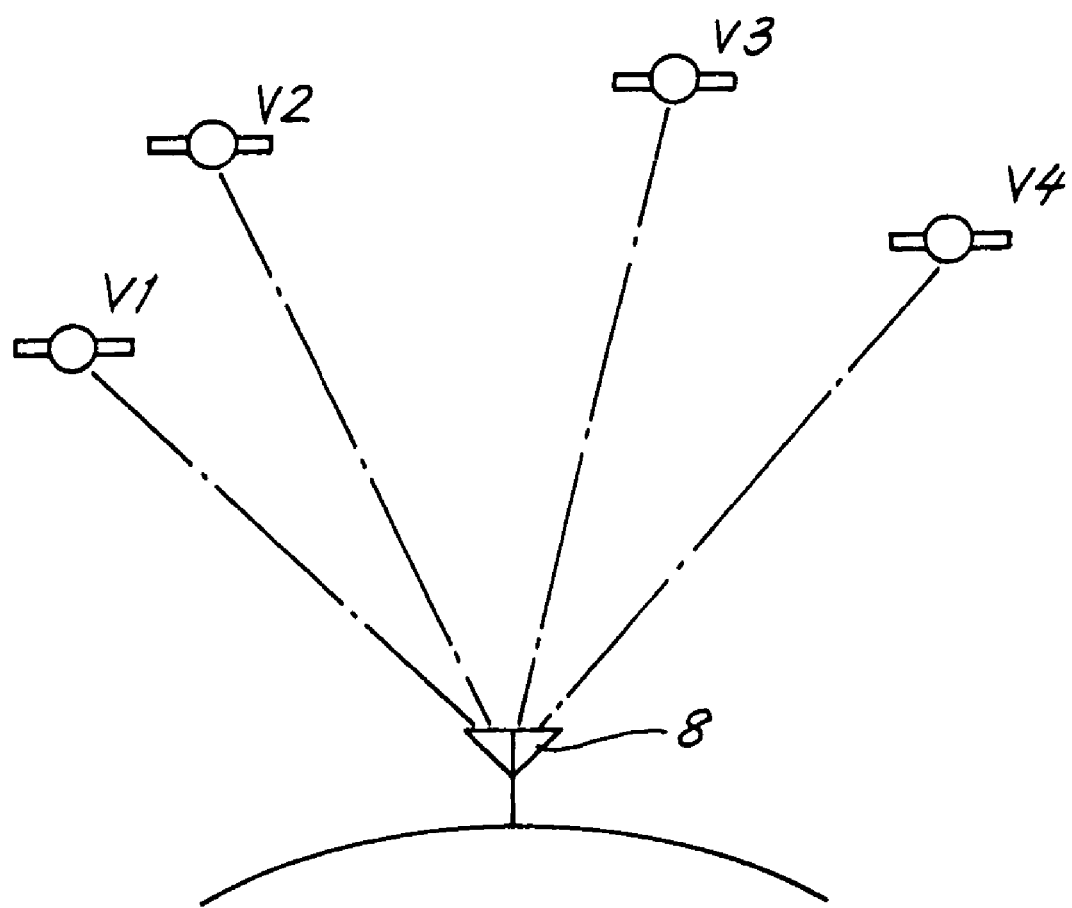

PORTABLE TERMINAL DEVICE AND COMMUNICATIONS DEVICE SYSTEM WHEREIN THE DEVICE IS USED

TECHNICAL FIELD

The present invention relates to portable terminal devices, such as cellular phones or PDAs, having a location detecting function with use of GPS, and communications device systems wherein the portable terminal device is used.

BACKGROUND ART

A portable telephone or cellular phone will be described below as an example of portable terminal device. FIG. 4 is a perspective view showing the appearance of a conventional cellular phone, and FIG. 5 is a block diagram of the interior thereof. The phone has a cabinet 1 comprising two cabinet half segments 10, 10a which are connected together by a hinge 11. The cabinet half segment 10 is provided with an antenna 6, microphone for capturing voice and a plurality of manual buttons 20, 20. The other cabinet half segment 10a is provided with a display 5 which is an LCD and a speaker 90 for reproducing the voice of the other party.

With reference to FIG. 5, a signal from a base station 7 is received by a receiver 61 via the antenna 6 and a duplexer 60 and sent to a control circuit 3 having a timer function. The duplexer 60 is a device which uses the same antenna for two-way transmission and which handles transmitted signals and received signals using the single antenna 6.

The control circuit 3 has connected thereto an incoming call alarm 50 comprising a ringer and vibrator for notifying the user of incoming calls, a memory 4 having stored therein an operating program, melody to be produced upon receiving an incoming call, etc., the display 5 which is an LCD for showing the state of communication, a manipulator 2 including the manual buttons 20, 20, the microphone 9 and the speaker 90.

The incoming call alarm 50 notifies the user of an incoming call received. The voice of the other party is emitted by the speaker 90, while the voice of the user is captured by the microphone and sent from a transmitter 62 to the antenna 6 via the duplexer 60. At this time, the display 5 shows the state of communication, etc.

Cellular phones have been proposed in recent years which are adapted to determine the location of the phone itself using GPS, i.e., Global Positioning System (see, for example, the publications of JP-A No. 2000-241964 and JP-A No. 1999-64482). The principle of GPS will be described briefly with reference to FIG. 6.

As shown in FIG. 6, the GPS antenna 8 of a cellular phone receives signals, termed C/A cord, from four artificial satellites V1, V2, V3, V4 whose positions are known relative to the earth. The C/A cord is transmitted also from the cellular phone. The time difference between the C/A cord transmitted from the phone and the C/A cord received from each artificial satellite is measured, and the measurement is multiplied by the velocity of propagation of radio waves to obtain the distance from the satellite to the GPS antenna 8. The position and height of the GPS antenna 8 can be determined by solving an equation representing a sphere (because the earth is a sphere) using the positions of the satellites and the distances from the satellites to the GPS antenna 8.

However, the cellular phone described has the following problems.

With an increase in the number of subscribers of cellular phones, problems arise as to how to use the phone in public places.

Cellular phones should not be used, for example, in hospitals since the radio waves of cellular phones are likely to cause a malfunction of medical electronic devices. Incoming call sound alarms cause a public nuisance if released in libraries or museums which must be kept quiet. In such cases, forcible restrictions on the use of cellular phones are desirable, but the matter is presently left to the discretion of the user. Especially as to incoming calls, if the subscriber is at a location accessible by incoming radio waves, it is impossible to shut off the incoming call unless the subscriber turns off the power source. It is nevertheless troublesome for the user to turn on or off the power source every time the user moves from one place to another.

In view of the fact that cellular phones adapted to detect their own location as described above are placed into wide use, the present applicant has conceived the idea of specifying an area where no phone calls should be made and causing the phone to automatically reject incoming calls when the location of the phone as detected by GPS or the like is within the specified area. The inventor has also conceived the idea of specifying not only areas but also callers and time as to incoming calls and rejecting the incoming call from the specified person in the specified period of time.

An object of the present invention is to automatically reject incoming calls to a cellular phone as positioned in a specified location at a specified time, and incoming calls from a specified subscriber so as to eliminate the cumbersome procedure of turning on or off the power source.

DISCLOSURE OF THE INVENTION

The present invention provides a portable terminal device comprising an antenna 6 for receiving radio waves from a base station 7, an incoming call alarm 50 for notifying the user of the reception of radio waves, a control circuit 3 provided between the antenna 6 and the alarm 50 for activating the alarm 50 and a memory 4. The memory 4 is capable of storing therein a predetermined incoming call rejecting condition or incoming call notifying condition via the control circuit 3.

The control circuit 3 includes comparison means for detecting whether one of information as to the current time and date, information as to the self-location of the device and information as to the caller, or the combination of these items of information is in match with the incoming call rejecting condition or incoming call notifying condition stored in the memory 4.

The control circuit 3 has the function of changing over to predetermined incoming call rejecting means or incoming call notifying means when a match is obtained.

BRIEF DESCRIPTION OF THE DRAWINGS

FIG. 6 is a diagram showing the principle of GPS.

BEST MODE OF CARRYING OUT THE INVENTION

An embodiment of the invention will be described below in detail.

Figure 1:
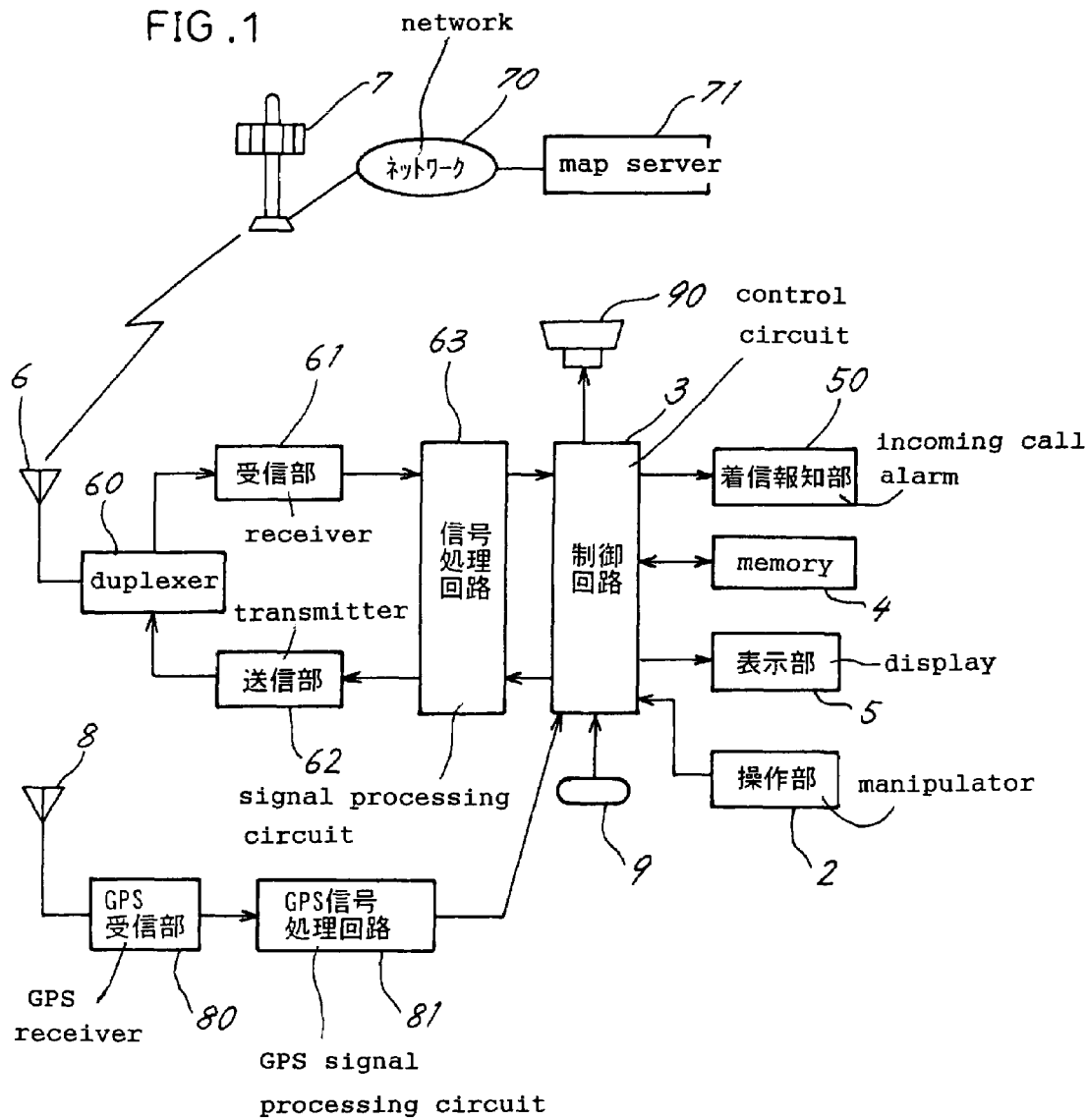
FIG. 1 is a block diagram of the interior of a cellular phone embodying the invention.
Figure 4:
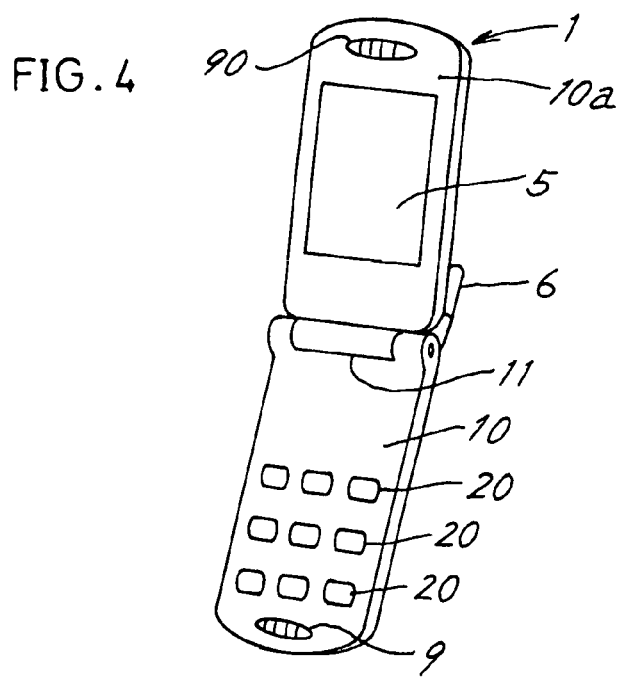
FIG. 4 is a perspective view showing the appearance of a conventional cellular phone.
Figure 5:
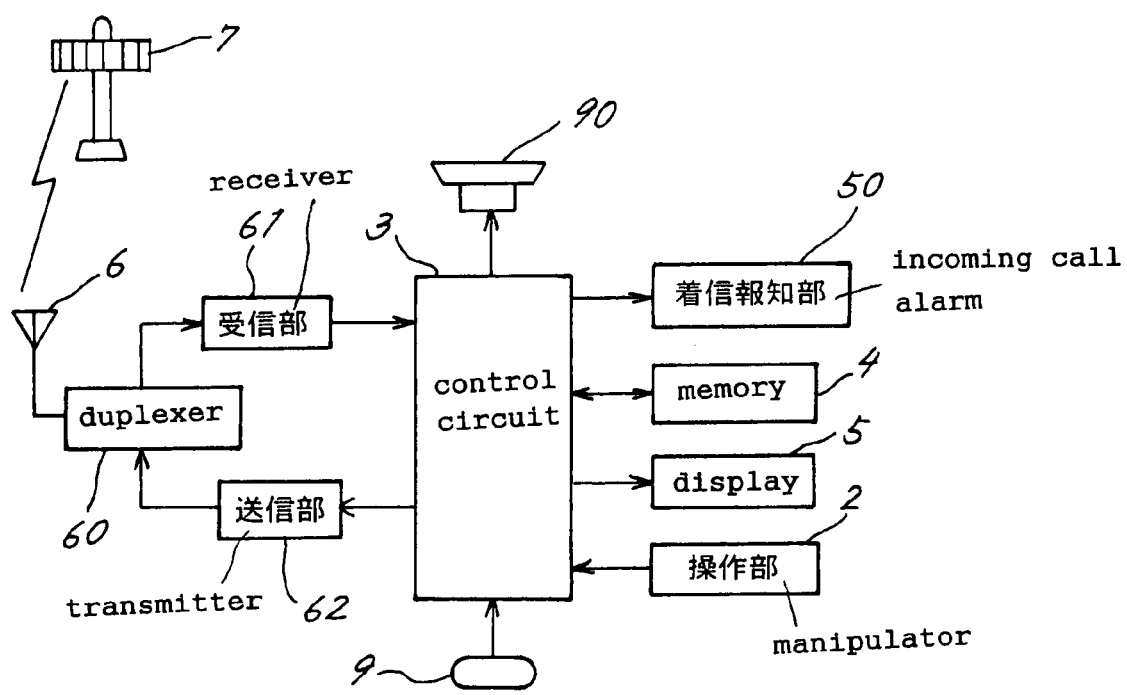
FIG. 5 is a block diagram of the interior of the conventional cellular phone.

FIG. 1 is a block diagram of the interior of a cellular phone embodying the invention. The phone has generally the same appearance and shape as the conventional cellular phone shown in FIG. 4. The present embodiment is characterized in that incoming calls can be rejected automatically, for example, when the location of the phone itself fulfills predetermined conditions.

With reference to FIG. 1, a signal from a base station 7 is received by a receiver 61 via an antenna 6 and a duplexer 60 and sent to a signal processing circuit 63, which performs voice signal processing, detects the location of the cellular phone itself (self-location) and feeds the results to a control circuit 3. While the location of the phone can be determined based on information as to the region of the particular base station accessible to the radio waves of the cellular phone, the location can be determined with high accuracy from the combination of this information and the information from GPS to be described below.

The control circuit 3 has a timer function and has connected thereto an incoming call alarm 50, memory 4, display 5, manipulator 2, microphone 9 and speaker 90 like the conventional one. The current time is indicated by the control circuit 3 on the display 5.

The cellular phone also has a GPS antenna 8, and the signals from artificial satellites are received by a GPS receiver 80 via the GPS antenna 8 and then fed to a GPS signal processing circuit 81 connected to the control circuit 3. The circuit 81 converts the high-frequency signal received from the satellite to a low-frequency signal and detects the location of the cellular phone itself, i.e., the self-location.

Since the region to be covered by one base station 7 is wide, it is difficult to accurately determine the location of the cellular phone from the information received from the based station 7 only. It is impossible to capture radio waves indoors or in the shadows of buildings. Accordingly, the self-location is accurately detected from the combination of the information from the base station 7 and the signals from the artificial satellites.

The base station 7 is linled to a map server 71 via a network 70 of cellular phones. When requested from a cellular phone, a map data (image data) is read from the map server 71 by the station 7 and transmitted to the cellular phone. The network 70 may be linked to the map server 71 by way of a plurality of gateways for converting communications protocols. JP-A No. 2001-5381 discloses such a mapping system.

[Setting of Incoming Call Rejection]

When the location of the cellular phone fulfills the specified conditions, the user manipulates the phone to set the phone for automatic rejection of incoming calls. Incoming call rejection is selected by manipulating manual buttons 20 or a menu on the display 5, and the control circuit 3 sets a flag for the rejection and stores the flag in the memory 4.

The user then determines an area where incoming calls are to be rejected. Stated more specifically, the map server 71 is accessed via the base station 7 to download map data including the area of incoming call rejection to the cellular phone. After downloading, a cursor is moved on the display 5 using manual buttons 20 to specify the area for the rejection of incoming calls. The specified area is stored in the memory 4.

After the area setting, the time and date, or a period of time for the rejection of incoming calls are input by manipulating manual buttons 20 or a menu on the display 5, and the time and date, or the period of time is stored in the memory 4. Information as to the subscriber whose incoming calls are to be rejected, e.g., the caller's telephone number, is input by using manual buttons 20, and the caller's information is stored in the memory 4. Incidentally, an unnecessary item among the time, date, and caller's information need not be input, while such data can be input in a desired order. Furthermore, the decision for the automatic rejection of incoming calls may be input after setting the time and date, or the period time, and the caller's information.

[Incoming Call Rejecting Operation]

Figure 2:
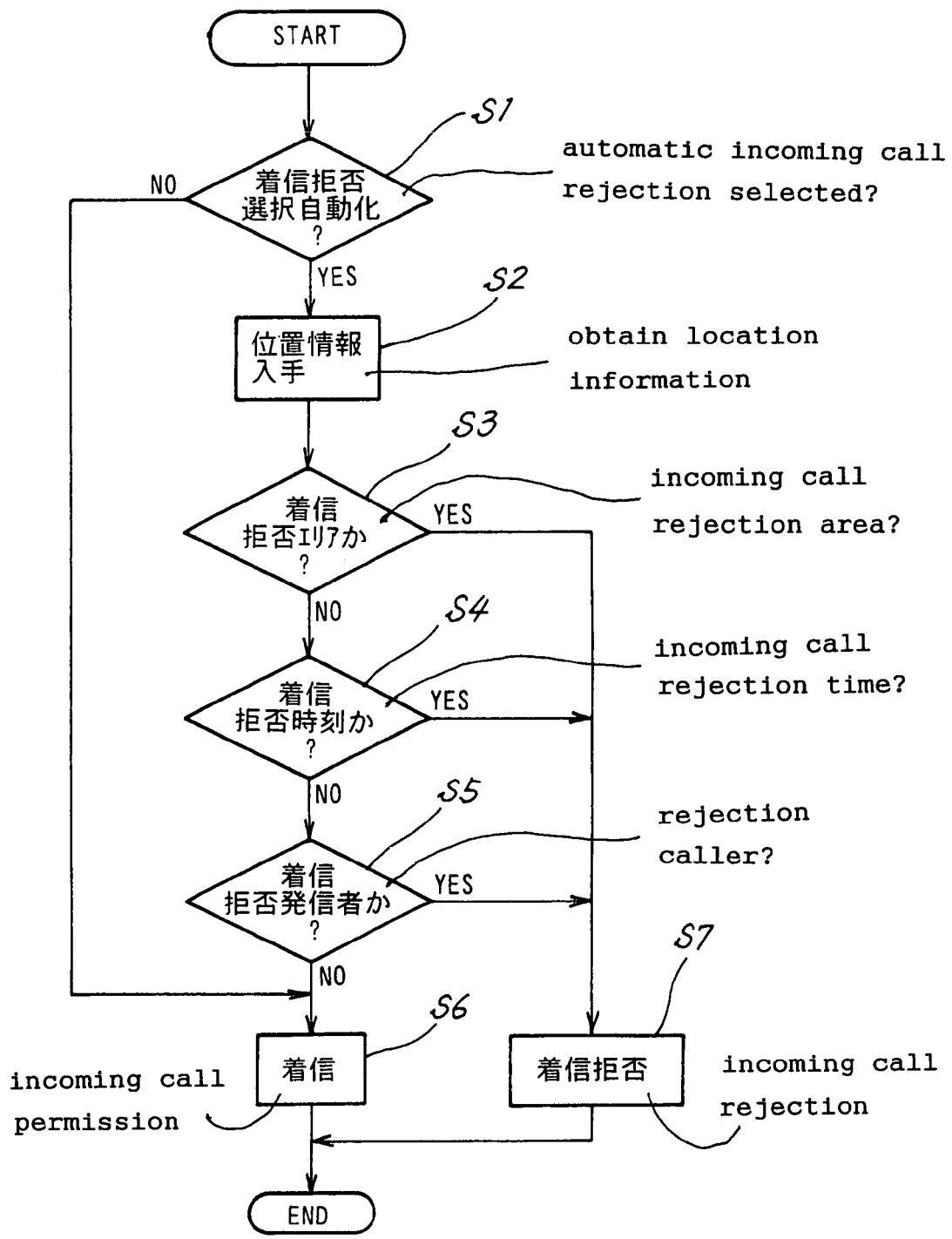
FIG. 2 is a flow chart showing an incoming call rejecting operation of the embodiment.

An operation of this embodiment for incoming call rejection will be described below with reference to the flow chart of FIG. 2.

The receiver 61 receives an incoming call request signal from the base station 7 via the antenna 6. The control circuit 3 checks the memory 4 for the presence or absence of a flag, and if the self-location, etc. meet the conditions, an inquiry is made as to whether the phone is set for automatic incoming call rejection (S1). When the answer is negative, permission is given for an incoming call (S6). If the inquiry is answered in the affirmative, the GPS receiver 80 is operated to obtain location information from artificial satellites (S2). As previously stated, the self-location is accurately determined from the combination of location information from GPS and that from the base station 7, and the control circuit 3 inquires whether the self-location is included in the area set in the memory 4 (S3). When the answer is affirmative, the incoming call is rejected (S7), whereas when the answer is negative, an inquiry is made as to whether the current time and date correspond to those stored in the memory 4, or as to whether the current time is included in the time period stored in the memory 4 (S4).

When the answer is affirmative, an incoming call rejection is made (S7). If otherwise, information as to the caller, i.e., the telephone number of the caller, is obtained from the incoming call request signal, and an inquiry is made as to whether the information corresponds to that stored in the memory 4 (S5). When the answer is affirmative, an incoming call rejection is made (S7). When the answer is negative, the incoming call is permitted (S6) since no conditions indicate that an incoming rejection is to be made.

Thus, when the user has stored the conditions for incoming call rejection in the memory 4, an incoming call rejection is made automatically, that is, communication is blocked, in the case where the self-location, etc. correspond to the conditions. This eliminates the procedure for turning off or on the power source every time the incoming call rejecting conditions are met.

Although the area, the time and date, or time period for incoming call rejection, and information as to the caller are mentioned as examples of conditions for incoming call rejection, these items of data may be used in combination as the incoming call rejection conditions. For example, data can be input to the memory 4 so that the calls from a specified subscriber are rejected during the specified period of time. Furthermore, the step S3 to step S5 can be changed suitably in order.

In place of incoming call rejecting conditions, incoming call notifying conditions may be set in the memory 4 for the incoming call alarm 50 (a ringer and vibrator, or light for indicating an incoming call as previously stated) to notify the user of an incoming call when the self-location, etc. are found in match with the conditions for the notification of incoming calls.

[Outgoing Call Rejecting Operation]

As an exemplary application of the foregoing, it appears possible to reject also outgoing calls based on the information as to the self-location obtained from the base station 7 and GPS satellites.

Figure 3:
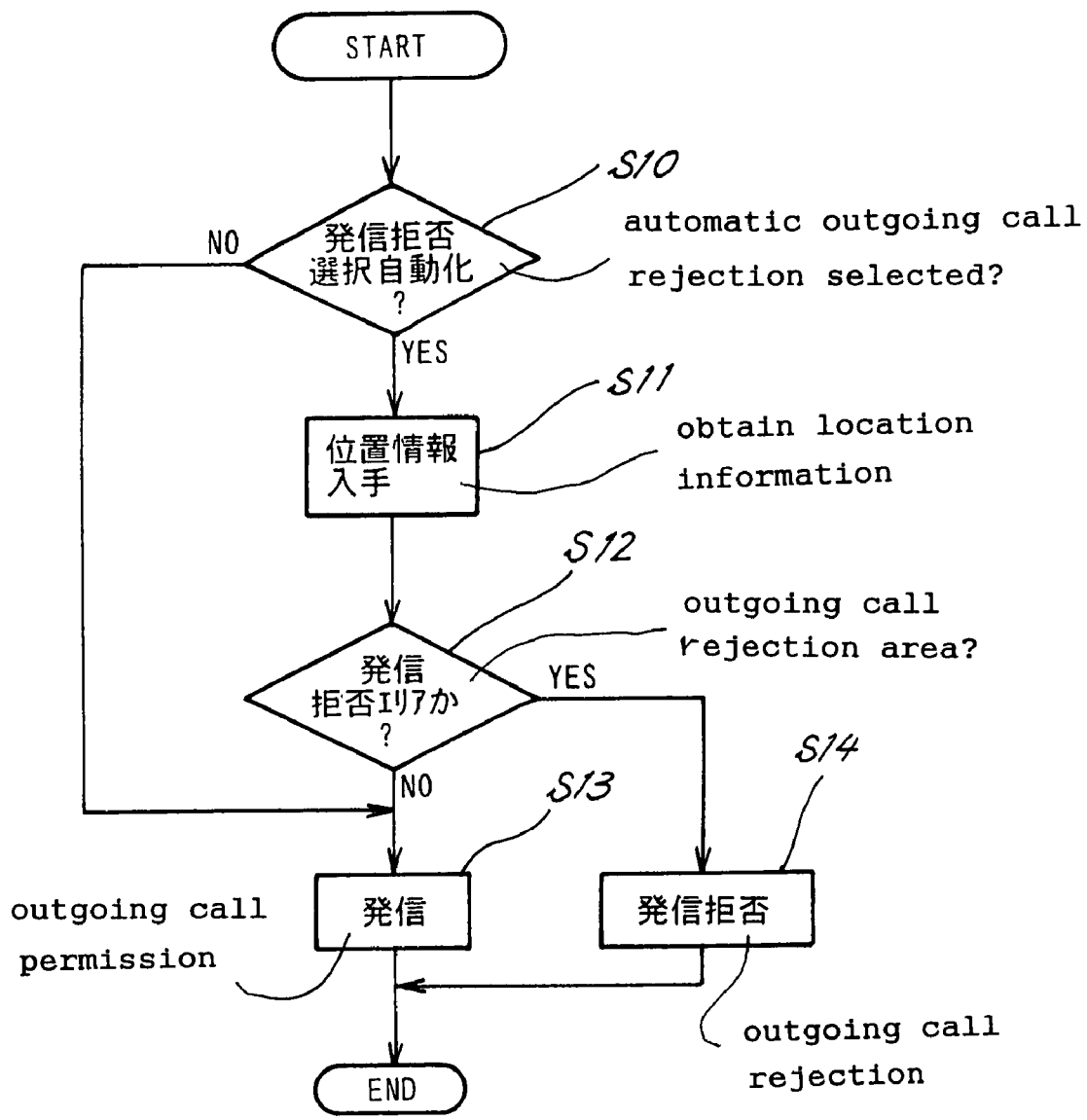
FIG. 3 is a flow chart showing an outgoing call rejecting operation.

FIG. 3 is a flow chart showing an outgoing call rejecting operation. Upon the user energizing the cellular phone for transmission, the control circuit 3 inquires whether the phone is set for automatic outgoing call rejection (S10) if the self-location, etc. meet the conditions. If the answer is negative, permission is given for an outgoing call (S13). When the answer is affirmative, the GPS receiver 81 is operated to obtain location information from artificial satellites (S11). The control circuit 3 inquires whether the self-location is included in the area set in the memory 4 (S12). When the answer is affirmative, an outgoing call is rejected (S14), whereas when the answer is negative, permission is given for an outgoing call (S13).

Unlike incoming calls, the time shown on the display 5 indicates to the user whether an outgoing call is to be made or not. It is also unlikely that the user himself or herself inputs data as to the caller. Accordingly, time or information as to the caller is not considered as conditions for outgoing call rejection.

On the other hand, it appears likely that the user will inadvertently enter an area where no outgoing calls are to be made while conducting a communication on the cellular phone. In view of such a situation, outgoing calls are rejected based on the self-location obtained from the base station 7 and GPS satellites.

Although the foregoing embodiment has been described with reference to cellular phones as portable terminal devices, such examples are not limitative; the present embodiment is usable also for PDA (Personal Digital Assistant).

Further like gpsOne (trademark), a server linked to the network 70 (see FIG. 1) may determine locations by providing a GPS antenna for the base station 7 and capturing radio waves from artificial satellites. This obviates the need for the cellular phone to determine the position from GPS signals and also serves to shorten the time for capturing radio waves from artificial satellites.

Although an incoming call is automatically rejected when the self-location, etc. correspond to the incoming call rejecting conditions according to the foregoing embodiment, the cellular phone may be set for a discretion mode (mode wherein the incoming call alarm sound is muted) only when the self-location, etc. correspond to the incoming call rejecting conditions.

INDUSTRIAL APPLICABILITY

The memory 4 is capable of storing therein at least one of a predetermined self-location condition, information as to time and date and information as to the caller which are incoming call rejecting conditions. The control circuit 3 detects whether one of information as to the current time and date, and self-location information and caller information which are obtained from an incoming call request signal received by the antenna 6, or the combination of these items of information is in match with the incoming call rejecting condition stored in the memory 4. When a match is obtained, the control circuit 3 rejects the incoming call without activating the incoming call alarm 50.

Stated more specifically, an area as of a hospital wherein it is desired not to sound the incoming call alarm is stored in the memory 4 as a self-location condition. If the user carrying the portable terminal device is positioned within the area, the control circuit 3 determines the location of the device from the signal received by the antenna 6 and automatically rejects incoming calls. This eliminates the troublesome procedure of turning off or on the power source every time the user moves into or out of the area. The same is true of the case wherein the time and date when the user does not desire to cause the terminal device to sound the alarm, or the telephone number of a caller which is caller information is input to the memory 4.

In the case where the memory 4 has stored therein an incoming call notifying condition, the control circuit 3 detects whether one of information as to the current time and date, self-location information and caller information, or combination of these items of information is in match with the incoming call notifying condition in the memory 4. When a match is found, the control circuit 3 activates the incoming call alarm 50.

The invention claimed is:

1. A portable terminal device comprising an antenna for receiving radio waves from a base station, an incoming call alarm for notifying the user of the reception of radio waves, a control circuit provided between the antenna and the alarm for activating the alarm and a memory, the portable terminal device being characterized in that:

the memory is capable of storing therein a predetermined incoming call rejecting condition or incoming call notifying condition via the control circuit, the control circuit having the function of operating to obtain location information when it receives an incoming call request signal, the control circuit including comparison means for detecting whether information as to the self-location of the device is in match with the incoming call rejecting condition or incoming call notifying condition stored in the memory, the control circuit having the function of changing over to predetermined incoming call rejecting means or incoming call notifying means when a match is obtained.

2. A portable terminal device according to claim 1 wherein the incoming call rejecting condition and the incoming call notifying condition are each at least one of the self-location condition, time information and caller information.

3. A portable terminal device according to claim 1 or 2 wherein the control circuit has connected thereto a GPS receiver for receiving radio waves transmitted from GPS satellites and obtains the self-location information from the GPS receiver.

4. A portable terminal device according to claim 1 wherein the base station is linked to a map sewer having stored therein map information, and a location information map obtained from the map sewer is used for setting the self location condition to be stored in the memory.

5. A portable terminal device according to claim 3 wherein the control circuit detects whether the self location information received by the antenna or the GPS receiver is in match with the self location condition stored in the memory and rejects transmission of an outgoing call when a match is obtained.

6. A communications device system comprising:
a base station, and a portable terminal device, the portable terminal device comprising:
an antenna for receiving radio waves from the base station,
an incoming call alarm for notifying the user of the reception of radio waves,
a control circuit provided between the antenna and the alarm for activating the alarm and a memory,
the memory being capable of storing therein a predetermined incoming call rejecting condition or incoming call notifying condition via the control circuit,
the control circuit having the function of operating to obtain location information when it receives an incoming call request signal,
the control circuit including comparison means for detecting whether-one-of information as to the self-location of the device is in match with the incoming call rejecting condition or incoming call notifying condition stored in the memory,
the control circuit having the function of changing over to predetermined incoming call rejecting means or incoming call notifying means when a match is obtained.

7. A portable terminal device comprising an antenna for receiving radio waves from a base station, an incoming call alarm for notifying the user of the reception of radio waves, a control circuit provided between the antenna and the alarm for activating the alarm and a memory, the portable terminal device being characterized in that:
the memory is capable of storing therein a predetermined incoming call rejecting condition or incoming call notifying condition via the control circuit,
the control circuit including comparison means for detecting whether information as to the current time and date, information as to the self-location of the device and information as to the caller is in match with the incoming call rejecting condition or incoming call notifying condition stored in the memory,
the control circuit having the function of changing over to predetermined incoming call rejecting means or incoming call notifying means when a match is obtained.

* * * * *

UNITED STATES PATENT AND TRADEMARK OFFICE
CERTIFICATE OF CORRECTION

| | |
|---|---|
| PATENT NO. | : 7,383,059 B2 |
| APPLICATION NO. | : 10/504323 |
| DATED | : June 3, 2008 |
| INVENTOR(S) | : Tsuyoshi Egami et al. |

It is certified that error appears in the above-identified patent and that said Letters Patent is hereby corrected as shown below:

On the Title page:

Item (73) Assignee: should read -- Sanyo Electric Co., Ltd., Moriguchi-shi, Japan --.

Signed and Sealed this

Twenty-eighth Day of October, 2008

JON W. DUDAS
*Director of the United States Patent and Trademark Office*